United States Patent
Kramer et al.

(10) Patent No.: US 7,490,352 B2
(45) Date of Patent: Feb. 10, 2009

(54) SYSTEMS AND METHODS FOR VERIFYING TRUST OF EXECUTABLE FILES

(75) Inventors: Michael Kramer, Yonkers, NY (US); Kenneth D. Ray, Seattle, WA (US); Paul England, Bellevue, WA (US); Scott A. Field, Redmond, WA (US); Jonathan D. Schwartz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 280 days.

(21) Appl. No.: 11/100,770

(22) Filed: Apr. 7, 2005

(65) Prior Publication Data

US 2006/0230451 A1 Oct. 12, 2006

(51) Int. Cl.
*G06F 21/22* (2006.01)
*G06F 21/00* (2006.01)
*G06F 12/14* (2006.01)

(52) U.S. Cl. .............................. 726/22; 726/23; 726/24; 726/25; 713/188; 713/189; 713/190; 717/127; 717/130; 717/131

(58) Field of Classification Search ........................ None
See application file for complete search history.

(56) References Cited

U.S. PATENT DOCUMENTS

| 5,956,481 | A | * | 9/1999 | Walsh et al. | 726/23 |
| 6,006,328 | A | * | 12/1999 | Drake | 726/23 |
| 6,073,239 | A | * | 6/2000 | Dotan | 726/24 |
| 2001/0033657 | A1 | * | 10/2001 | Lipton et al. | 380/201 |
| 2004/0054917 | A1 | * | 3/2004 | Obrecht et al. | 713/200 |
| 2005/0039082 | A1 | * | 2/2005 | Nachenberg | 714/38 |
| 2006/0130144 | A1 | * | 6/2006 | Wernicke | 726/24 |
| 2006/0161761 | A1 | | 7/2006 | Schwartz et al. | |

FOREIGN PATENT DOCUMENTS

GB 2365158 A * 2/2002

* cited by examiner

*Primary Examiner*—Syed A. Zia
(74) *Attorney, Agent, or Firm*—Lee & Hayes, PLLC

(57) ABSTRACT

Systems and methods for validating integrity of an executable file are described. In one aspect, the systems and methods determine that an executable file is being introduced into a path of execution. The executable file is then automatically evaluated in view of multiple malware checks to detect if the executable file represents a type of malware. The multiple malware checks are integrated into an operating system trust verification process along the path of execution.

17 Claims, 3 Drawing Sheets

SYSTEMS AND METHODS FOR VERIFYING TRUST OF EXECUTABLE FILES

TECHNICAL FIELD

This disclosure relates to data authentication and verification.

BACKGROUND

An executable file (e.g., a binary image, object code, portable executables (PEs), macros, scripts like Visual Basic script (VBS), etc.) can be risky to run on a computer as it may contain a virus or a Trojan horse. A virus is a program or piece of code that modifies a binary image on disk, typically against the user's wishes and without the user's knowledge. Viruses can also replicate themselves. A simple virus that can make a copy of itself over and over again is relatively easy to produce. Even simple viruses are dangerous because they may quickly use all available memory and bring a system to a halt. Some viruses are capable of transmitting themselves across networks and bypassing security systems. Unlike viruses, Trojan horses do not replicate themselves but they can be just as destructive, often masquerading as benign applications that can be launched by an unsuspecting user. One type of Trojan horse is a program that claims to rid your computer of viruses but instead introduces viruses onto your computer.

One approach to identify executable code that has been corrupted, for example, with a virus or a Trojan horse, involves the use of trusted cryptographic hashes when installing or downloading an executable onto a computing device. A cryptographic hash, or simply a "hash", compiles an executable into a summarized form, or digest. A trusted hash is known to be good, or represent uncorrupted code, at the time of the hashes' creation (e.g., at build time). To generate trusted hashes for an executable file (i.e., a binary image, executable code, scripts, macros, etc.), a message digest or checksum calculation is performed on the executable, including associated resources such as data, to obtain a first trusted result (e.g., at build time) before transferring the executable from one location to another. The same calculation is made on the transferred executable to obtain a second result. The first trusted result is compared to the second result to determine if the received executable is the same data that was originally sent. For instance, if the before and after calculation results match, then the received data is likely accurate. Otherwise, the received executable has been corrupted. In this manner, the risk of downloading or installing a corrupted binary image has been effectively reduced.

Although conventional techniques to verify files at installation reduce the risk of installing files associated with trusted hashes, these conventional techniques do not reduce the risk of installing files from untrusted sources (e.g., without a trusted hash or signature of the file), executing files after they have been installed onto a computing device, or executing files that are part of the basic input output system (BIOS). Problems associated with installing a file from an untrusted source onto a computing system are well known. To make matters worse, files verified for integrity at installation-time can be corrupted after installation, making any initial trust verification evaluations obsolete. Additionally, today's computer systems have no inherent mechanism to distinguish between trusted and suspect or malicious executable object codes. In the case of a file loaded into BIOS firmware, when the file is loaded for execution during boot-up operations, conventional systems typically do not have enough code integrity checking infrastructure in place (loaded) at that time to adequately perform code integrity or any other type of virus, spy ware, or other malicious software (malware) check on the file prior to its execution as part of the boot-up process.

SUMMARY

Systems and methods for validating integrity of an executable file are described. In one aspect, the systems and methods determine that an executable file is being introduced into a path of execution. The executable file is then automatically evaluated in view of multiple malware checks to detect if the executable file represents a type of malware. The multiple malware checks are integrated into an operating system trust verification process along the path of execution.

BRIEF DESCRIPTION OF THE DRAWINGS

In the Figures, the left-most digit of a component reference number identifies the particular Figure in which the component first appears.

DETAILED DESCRIPTION

Overview

Figure 1:
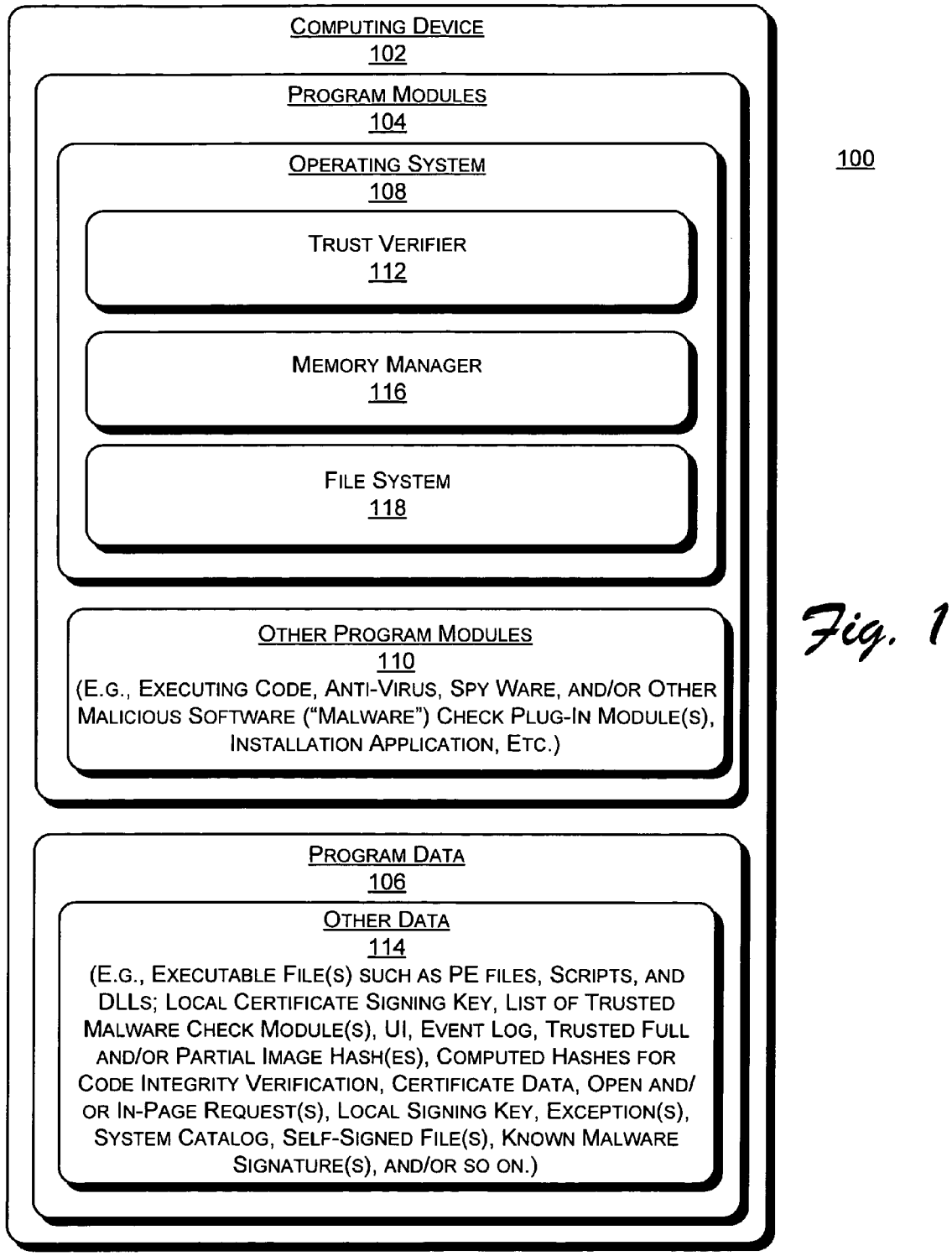
FIG. 1 illustrates an exemplary system for verifying trust of executable files.

The systems and methods for verifying trust of executable files address the limitations of conventional code integrity checking techniques and independent (non-integrated) malware checks by providing a comprehensive trust verification facility that is integrated into an operating system (OS). The trust verification facility includes multiple trust verifiers that are automatically invoked when executable files are being installed onto a system, and when code is being mapped into memory for execution. Respective ones of the trust verifiers determine if the executable code is from a trusted source (e.g., code signed by a trusted certificate authority) and further evaluate the executable code for Trojan Horses (code integrity), viruses, spyware, and/or other types of known malware. Known Malware is malware associated with a known malware signature or other known malware characteristic.

If the code is determined to be malware, the systems and methods for verifying trust of executable files mark the code "untrusted", or untrustworthy. Untrusted code is not installed or executed. If the code is determined not to be from a trusted source and determined not to be a known type of malware, a system administrator is provided with an opportunity to authorize the trustworthiness of the code (e.g., by digitally signing the file with a local key). This opportunity is presented to the system administrator in view of respective indications from a trust verifier chain that the code does not represent a known-type of malware. As such, the system administrator can make an educated decision as to whether to install or execute code that has not been validated by an outside trusted $3^{rd}$ party. Once code is marked trustworthy, if the code is ever subsequently modified (e.g., introducing a Trojan horse), such modification will be detected prior to execution by the systems and methods for trust verification, and the code will not be allowed to execute.

In view of the above, only after the systems and methods for verifying trust of executable files indicate that an executable file is not a known type of malware, do the systems and methods allow the executable file to be installed or executed. This is in stark contrast to conventional systems, which do not automatically perform multiple file malware evaluations on an executable file during installation or immediately prior to being loaded into memory for execution. Additionally, integration multiple trust verification into an operating system is very different from conventional systems, wherein virus, spy ware, or other forms of checking for malware are stand alone processes, processes that are not integrated into an operating system.

These and other aspects of the systems and methods for verifying trust of executable files are now described in greater detail.

An Exemplary System

Although not required, the systems and methods for verifying trust of executable files are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

FIG. 1 illustrates an exemplary system 100 for verifying trust of executable files. In this implementation, system 100 includes computing device 102. Computing device 102 is any type of computing device such as a personal computer, a laptop, a server, small form factor mobile computing device (e.g., a cellular phone, personal digital assistant, or handheld computer), etc. Computing device 102 includes program modules 104 and program data 106. Program modules 102 include, for example, operating system 108 to provide a runtime environment, and other program modules 110 such as executable object code (e.g., binary images, PE files, DLLs, scripts, etc.). As part of the runtime environment, operating system 108 includes trust verifier module 112, which provides an integrated file trust verification facility.

Responsive to detecting, by operating system 108, that an executable file (e.g., object code, scripts, DLLs, etc.) is being installed onto computing device 102, and/or loaded into memory for execution, trust verifier 112 determines whether the executable code is from a trusted source (e.g., a trusted certificate authority) and implements multiple trust verification checks to determine if the executable code is a known type of malware (e.g., does the code include a Trojan horse, virus, spyware, etc.). Techniques for determining that a file is being installed onto a computing device, loaded (e.g., paged) into memory for execution, whether a file is an executable file, and for evaluating whether a file is from a trusted authority are known.

Executable file trust verification checks implemented by trust verifier 112 include, for example, code integrity, virus, spy ware, and/or other malware checks. Techniques to evaluate code integrity of an executable file by comparing a trusted full image hash (if present) of the executable file, to a computed full hash of the executable file are known. Additionally, techniques to check an executable file for a virus or a Trojan horse are known. Exemplary techniques for trust verifier 112 to perform partial image hash verification operations responsive to a portion of an executable file being loaded into memory for execution are described in U.S. patent application Ser. No. 11/037,566, titled "Systems and Methods for Validating Executable File Integrity Using Partial Image Hashes", filed on Jan. 18, 2005, commonly assigned hereto, and hereby incorporated by reference. A partial image hash is a hash of less than an entire executable file. For instance, a partial image hash is a hash of one or more pages of an executable file (e.g., in the case of a PE file, and/or the like) or portions of the executable file not tied to page boundaries (e.g., in the case of a script, and/or the like).

In one implementation, trust verifier 112 verifies trust of an executable file with respective plug-in modules for one or more of digital certificate checking, virus, Trojan horse, spy ware, and/or other malware checks. For purposes of exemplary illustration, such plug-in modules are shown as respective portions of "other program modules" 110. In one implementation, the various malware checks implemented by trust verifier 112 trust chain can be customized. For example, plug-in modules that implement respective ones of the malware checks can be added and/or removed from the trust chain.

In one implementation, when accessing functionality associated with a particular malware check, trust verifier 112 detects whether the particular malware check is deactivated, and/or whether a non-authorized substitute for the particular malware check has been introduced into the trust chain. In one implementation, trust verifier 112 determines whether functionality associated with a particular malware check, and/or whether a malware check plug-in module is an authorized module by referencing a trusted list of malware check plug-ins. In this implementation, such a list is maintained by an administrator, or other authorized entity. For purposes of exemplary illustration, such a list is shown as a respective portion of "other data" 114.

If trust verifier 112 determines that the executable file is from a trusted source and not malware (e.g., no virus, no spy ware, no Trojan horse—successful hash checks, and/or so on), operating system 108 allows the process which triggered the trust verification process (e.g., file installation operations or operations to load the file into memory for execution) to complete. However, if trust verifier 112 determines that the executable file is not from a trusted source, and also determines that the executable file is not to be a known type of malware, trust verifier 112 (or operating system 108) provides a system administrator with an opportunity to authorize the trustworthiness of the executable file (e.g., by signing the file with a local key), indicate that the file is of questionable trustworthiness, or indicate that the file is untrustworthy. (Techniques for signing with a local key are known).

In one implementation, when an executable file is determined not to be from a trusted source and determined not to be a known type of malware, trust verifier 112 (or operating system 108) presents a dialog box or other user interface (UI) component (e.g., voice controlled) to the administrator to allow the administrator to authorize the trustworthiness, questionable trustworthiness, or untrustworthiness of the executable file. For purposes of exemplary illustration, such a UI is shown as a respective portion of "other data" 114. In this scenario, and because trust verifier 112 evaluates the executable file in view of multiple malware checks, trust verifier 112 provides an administrator with substantially superior levels of knowledge regarding the file's trustworthiness, as compared to conventional systems and techniques. Thus, the system administrator can make an educated decision as to whether to authorize the file's trustworthiness, and subsequently allow or bar file installation and/or execution of code that has not been previously been validated by an trusted outside $3^{rd}$ party.

In view of the above, trust verification 112 operations are invoked at various times associated with computer-program installation and execution operations. For purposes of description, these various times are referred to as times when the program is being "introduced into a path of execution." In this implementation, for example, trust verification operations are invoked both during program installation and after program installation (e.g., responsive to determining that the program is targeted for loading into memory for execution). In another implementation, trust verifier 112 operations are implemented at one or more of the above described times, and, or at other time(s) associated with when the program is introduced into a path of execution.

If trust verifier 112 determines that the executable file is malware (regardless of whether it is signed by a trusted source), trust verifier 112 (or operating system 108) marks the code "untrusted", or untrustworthy. In this scenario, and if the trust verifier operations are responsive to code installation operations, operating system 108 does not install the untrusted code onto computing device 102. Additionally, if the trust verifier operations are responsive to operating system 108 preparation(s) to load the code into memory for execution, operating system 108 does not allow the untrusted code to be loaded into memory for execution. This means that even if an executable file is marked trustworthy, as described above, if the code is ever subsequently modified (e.g., introducing a Trojan horse), such modification will be detected by trust verifier 112 prior to execution of the code, and the code will not be allowed to execute.

Exemplary trust verifier 112 trust chain operations (i.e., malware detection operations) are now described.

Exemplary Protection Path

Trust verifier 112 or operating system 108, responsive to determining that an executable file targeted for installation onto computing device 102 or loading into memory for execution is not trustworthy, automatically implements a customizable protection path. For example, in one implementation, the protection path includes one or more of the following actions:

tagging the executable file as untrustworthy;
directing an installation module not to install the file, or directs memory manager 116 not to load any portion of the file into memory for execution;
throwing an associated event identifying the failed file verification, and/or
writing the event to an event log;
automatically evaluating substantially all files (executable and data files) on computing device 102 to determine if respective ones of the files are from a trusted source an represent a known type of malware; and/or
powering down computing device 102.

In one implementation, the protection path identifies one or more action rules for implementation when a file fails trust verification, the alert(s) to be sent, logging operations to be taken, etc. In one implementation, the protection path is based on group policy and/or user interface settings to provide a uniform user experience.

An Exemplary Procedure

Figure 2:
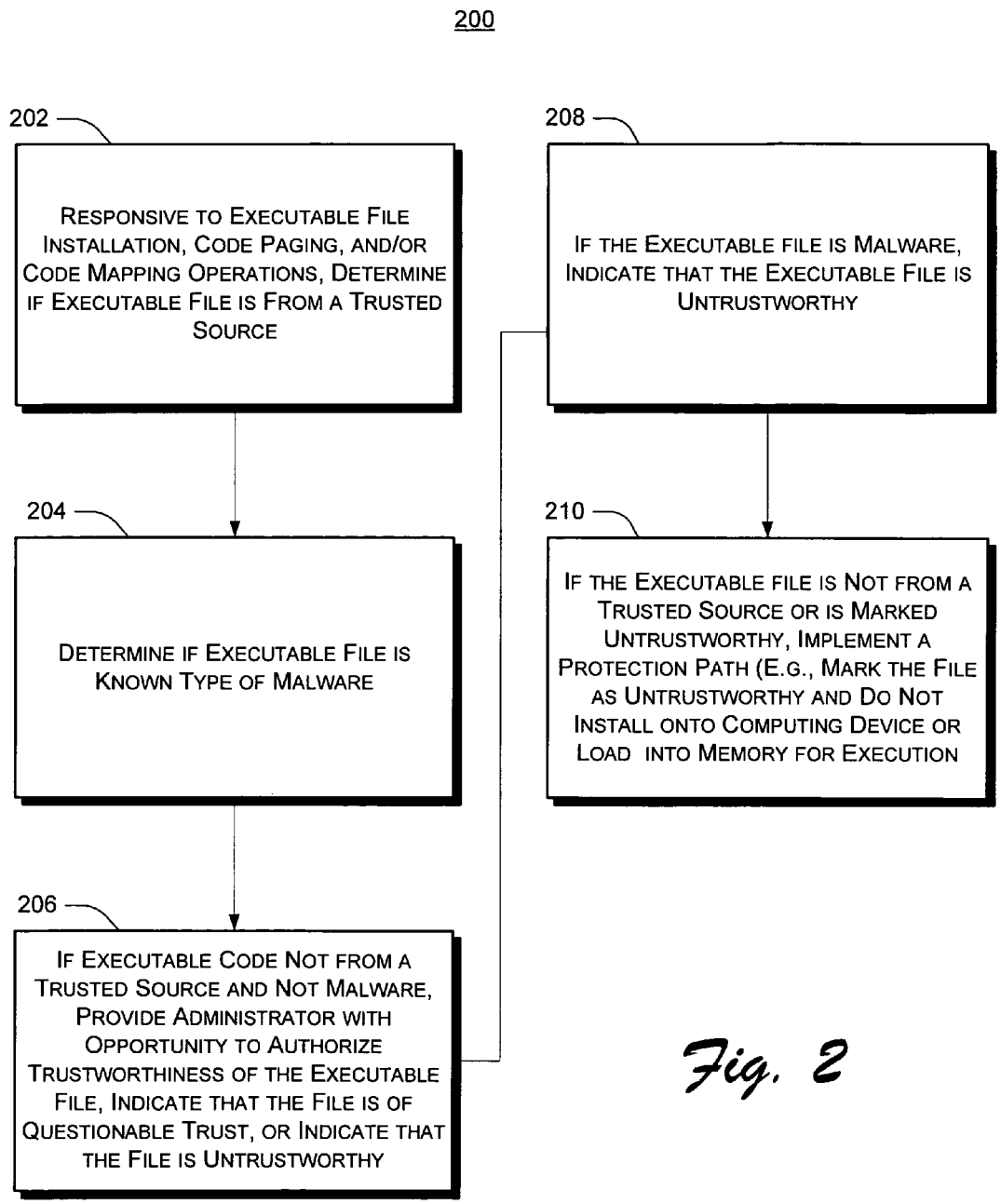
FIG. 2 shows an exemplary procedure for verifying trust of executable files.

FIG. 2 shows an exemplary procedure 200 for verifying trust of executable files. For purposes of discussion and illustration, operations of the procedure are described with respect to components of FIG. 1. The left-most digit of a component reference number identifies the particular figure in which the component first appears. At block 202, operating system 108 (e.g., a file system or a memory manager portion of the operating system) determines that an executable file is being installed onto computing device 102, or being loaded (not yet loaded) into memory for execution. Responsive to this determination, trust verifier 112 evaluates the executable file to determine if it is from a trusted source (e.g., digitally signed by a trusted certificate authority).

At block 204, trust verifier 112 determines if the executable file represents a known type of malware. In one implementation, after the executable file has been installed onto computing device 102 and in addition to what has already been described above, these operations include determining if a signature associated with the executable file matches a known malware signature, whereupon the executable file is determined to be malware. For purposes of illustration, a list of one or more known malware signatures is shown as a respective portion of "other data" 114. In one implementation, this list is distributed to the trust verifier 112 to identify any executable file(s) that may have initially been deemed trustworthy at the time of program installation, but later determined to constitute or otherwise comprise malicious code.

At block 206, if the executable file is not from a trusted source and not malware, trust verifier 112 (or operating system 108) provides an administrator with an opportunity to authorize the trustworthiness of the file, indicate that the file is of questionable trust, or indicate that the file is untrustworthy. At block 208, if the executable file is not from a trusted source or was determined to be malware (block 204), trust verifier 112 marks/tags the file as untrustworthy. In one implementation, wherein the executable file had previously been marked as trustworthy, these operations include automatic revocation of trust (or downgrading of trust) associated with an executable file (e.g., when the executable file was determined to have a signature that matched a known malware signature).

At block 210, if the executable file is not from a trusted source or marked untrustworthy, trust verifier 112 (or operating system 108) implements a protection path. For example, if the executable file is being installed onto computing device 102, the protection path at least fails the installation operations for the executable file. In another example, if at least a portion of the executable file is being loaded into memory for execution on computing device 102, the protection path at least fails the memory loading operations so the file will not be loaded into memory for execution.

An Exemplary Operating Environment

Figure 3:
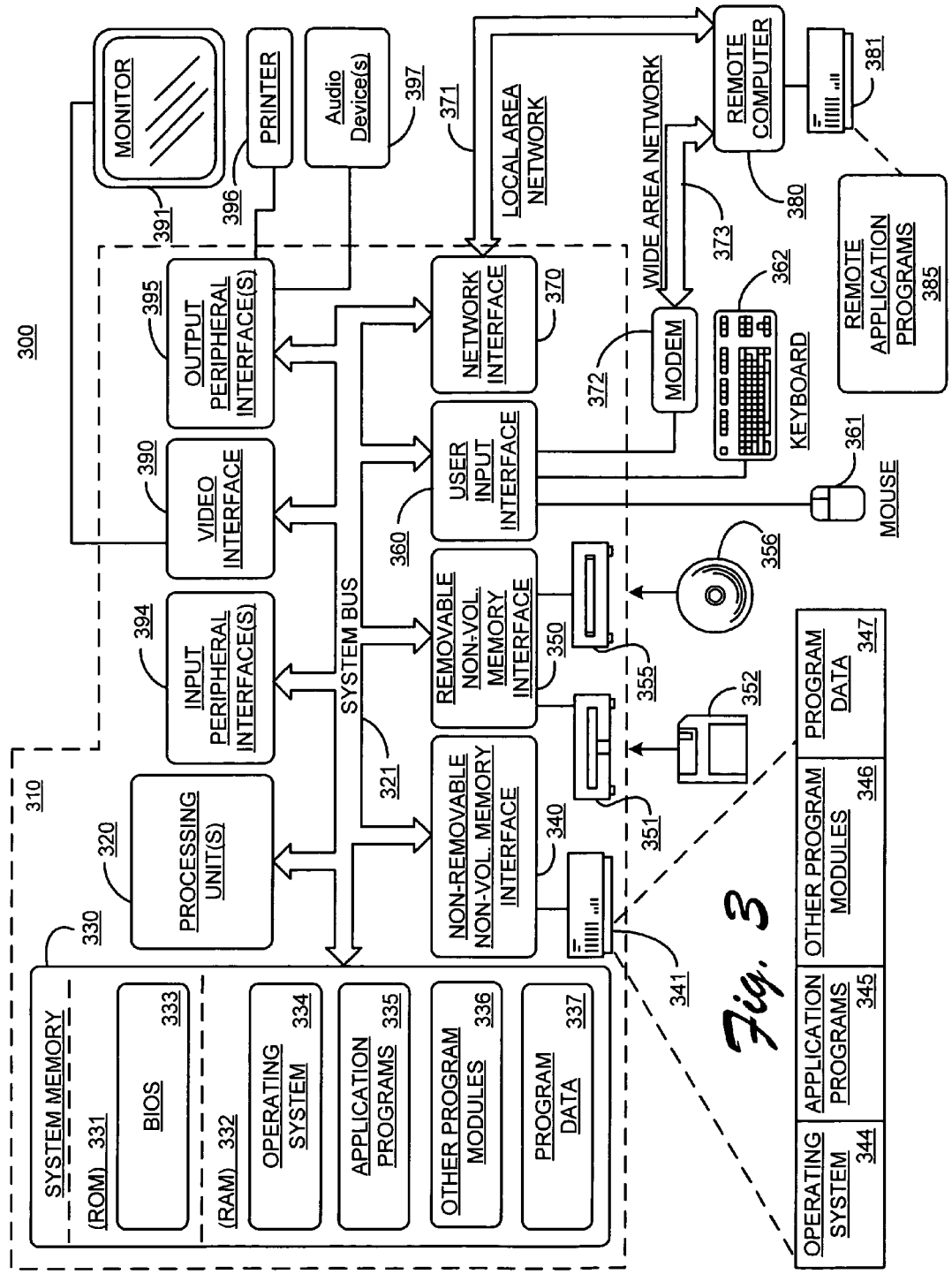
FIG. 3 shows an example of a suitable computing environment in which systems and methods for verifying trust of executable files may be fully or partially implemented.

FIG. 3 illustrates an example of a suitable computing environment 300 in which the systems and methods for verifying trust of executable files may be fully or partially implemented. Exemplary computing environment 300 is only one example of a suitable computing environment for the exemplary system of FIG. 1 and exemplary operations of FIG. 2, and is not intended to suggest any limitation as to the scope of use or functionality of systems and methods the described herein. Neither should computing environment 300 be interpreted as having any dependency or requirement relating to any one or combination of components illustrated in computing environment 300.

The methods and systems described herein are operational with numerous other general purpose or special purpose computing system, environments or configurations. Examples of well-known computing systems, environments, and/or configurations that may be suitable for use include, but are not limited to, personal computers, laptops, small form factor mobile computing device (e.g., a cellular phone, personal digital assistant, or handheld computer), server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 3, an exemplary system 300 illustrates an example of a suitable computing environment in which systems and methods for verifying trust of executable files may be fully or partially implemented. System 300 includes a general purpose computing device in the form of a computer 310 implementing, for example, client computer 102 of FIG. 1. Components of computer 310 may include, but are not limited to, processing unit(s) 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 310 typically includes a variety of computer-readable media. Computer-readable media can be any available media that can be accessed by computer 310 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 310.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example and not limitation, FIG. 1 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Application programs 335 include, for example, program modules 104 of FIG. 1. Program data 337 includes, for example, program data 106 of FIG. 1. Operating system 344, application programs 345, other program modules 346, and program data 347 are given different numbers here to illustrate that they are at least different copies.

A user may enter commands and information into the computer 310 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus 321, but may be connected by other interface and bus structures, such as a parallel port, game port or a universal serial bus (USB).

A monitor 391 or other type of display device is also connected to the system bus 321 via an interface, such as a video interface 390. In addition to the monitor, computers may also include other peripheral output devices such as printer 396 and audio devices 397, which may be connected through an output peripheral interface 395.

The computer 310 operates in a networked environment using logical connections to one or more remote computers, such as a remote computer 380. The remote computer 380 may be a personal computer, a server, a router, a network PC, a peer device or other common network node, and as a function of its particular implementation, may include many or all of the elements (e.g., program module(s) 104 and program data 106, etc.) described above relative to the computer 102, although only a memory storage device 381 has been illustrated in FIG. 3. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example and not limitation, FIG. 3 illustrates remote application programs 385 as residing on memory device 381. The network connections shown are exemplary and other means of establishing a communications link between the computers may be used.

CONCLUSION

Although the systems and methods for verifying trust of executable files have been described in language specific to structural features and/or methodological operations or actions, it is understood that the implementations defined in the appended claims are not necessarily limited to the specific features or actions described. For example, although trust verifier 112 is shown independent of memory manager 116 and file system 118, in one implementation, trust verifier is a plug-in to memory manager 116 or file system 118. In another example, although system 100 has been described with respect to verifying trust of executable files, using the described methods system 100 can also be implemented to verify trust of data files. Accordingly, the specific features and operations are disclosed as exemplary forms of implementing the claimed subject matter.

The invention claimed is:

1. A computer-implemented method for verifying trust of an executable file in an operating system environment, the method comprising:
   determining that the executable file is being introduced into a path of execution, wherein the path of execution is such that the executable file is not installed or loaded into memory for execution;
   responsive to said determining, automatically evaluating the executable file with multiple malware checks to determine if the executable file represents a type of malware, wherein the multiple malware checks comprise a virus check, a spy ware check, and a code-integrity check; and
   if the executable file is determined to represent a type of malware, implementing a protection path, wherein the protection path comprises revoking trustworthiness of the executable file,
   if the executable file is not determined to represent a type of malware and is from a trusted source, allowing the path of execution, and
   if the executable file is not determined to represent a type of malware and is not from a trusted source, allowing a system administrator to make the decision whether to allow the path of execution or implement a protection path.

2. The method of claim 1, wherein the multiple malware checks are integrated into an operating system trust verification process along a path of execution.

3. The method of claim 1, wherein the path of execution comprises an installation path or a path associated with loading at least a portion of the executable code into memory for execution, the path associated with loading not representing the executable file actually being loaded into memory for execution.

4. The method of claim 1, wherein the multiple malware checks are integrated into a file system module or a memory manager module of the operating system.

5. The method of claim 1, wherein the executable file is being installed onto the computing device, and wherein the method further comprises:
   if the executable file is not malware in view of the multiple malware checks, allowing an entity to mark the executable file as trustworthy, of questionable trustworthiness, or untrustworthy; and
   installing the executable file onto the computing device only if the executable file is trustworthy.

6. The method of claim 1, wherein at least a portion of the executable file is being loaded into memory for execution, and wherein the method further comprises:
   if the executable file is not malware in view of the multiple malware checks;
   allowing an entity to mark the executable file as trustworthy, of questionable trustworthiness, or untrustworthy; and
   only if the executable file is trustworthy, loading the at least a portion of the executable file into memory for execution.

7. The method of claim 1, wherein the method further comprises responsive to determining that the executable file is being installed, automatically determining if the executable file is from a trusted source.

8. A computer-readable medium comprising computer-program instructions for verifying trust of an executable file in an operating system environment, executable by a processor for:
   determining that the executable file is being introduced into a path of execution, wherein the path of execution is such that the executable file is not installed or loaded into memory for execution;
   responsive to said determining, automatically evaluating the executable file with multiple malware checks to determine if the executable file represents a type of malware, wherein the multiple malware checks comprise a virus check, a spy ware check, and a code-integrity check; and
   if the executable file is determined to represent a type of malware, implementing a protection path,
   if the executable file is not determined to represent a type of malware and is from a trusted source, allowing the path of execution, and
   if the executable file is not determined to represent a type of malware and is not from a trusted source, allowing a system administrator to make the decision whether to allow the path of execution or implement a protection path.

9. The computer-readable medium of claim 8, wherein the multiple malware checks are integrated into an operating system trust verification process along a path of execution.

10. The computer-readable medium of claim 8, wherein the multiple malware checks are integrated into a file system module or a memory manager module of the operating system.

11. The computer-readable medium of claim 8, wherein the executable file is being installed onto the computing device, and wherein the computer-program instructions further comprise instructions for:

allowing, if the executable file is not malware in view of the multiple malware checks, an entity to mark the executable file as trustworthy, of questionable trustworthiness, or untrustworthy; and installing the executable file onto the computing device only if the executable file is trustworthy.

12. The computer-readable medium of claim 8, wherein at least a portion of the executable file is being loaded into memory for execution, and wherein the computer-program instructions further comprise instructions for:

if the executable file is not malware in view of the multiple malware checks;

allowing an entity to mark the executable file as trustworthy, of questionable trustworthiness, or untrustworthy; and only if the executable file is trustworthy, loading the at least a portion of the executable file into memory for execution.

13. The computer-readable medium of claim 8, wherein the executable file was determined to be trustworthy upon installation, and wherein the computer-program instructions further comprise instructions for:

determining, subsequent to installation of the executable file, that the executable file comprises malware; and wherein the protection path comprises revoking trustworthiness of the executable file.

14. A computing device for verifying trust of an executable file in an operating system environment, the computing device comprising:

a processor; and a memory coupled to the processor, the memory comprising computer-program instructions executable by the processor for:

determining that the executable file is being introduced into a path of execution, wherein the path of execution is such that the executable file is not installed or loaded into memory for execution;

responsive to said determining, automatically evaluating the executable file with multiple malware checks to determine if the executable file represents a type of malware, wherein the multiple malware checks comprise a virus check, a spy ware check, and a code-integrity check; and if the executable file is determined to represent a type of malware, implementing a protection path, if the executable file is not determined to represent a type of malware and is from a trusted source, allowing the path of execution, and if the executable file is not determined to represent a type of malware and is not from a trusted source, allowing a system administrator to make the decision whether to allow the path of execution or implement a protection path.

15. The computing device of claim 14, wherein the multiple malware checks are integrated into an operating system trust verification process along a path of execution.

16. The computing device of claim 14, wherein at least a portion of the executable file is being loaded into memory for execution, and wherein the computer-program instructions further comprise instructions for:

if the executable file is not malware in view of the multiple malware checks;

allowing an entity to mark the executable file as trustworthy, of questionable trustworthiness, or untrustworthy; and only if the executable file is trustworthy, loading the at least a portion of the executable file into memory for execution.

17. The computing device of claim 14, wherein the executable file was determined to be trustworthy upon installation, and wherein the computer-program instructions further comprise instructions for:

determining, subsequent to installation of the executable file, that the executable file comprises malware; and wherein the protection path comprises revoking trustworthiness of the executable file.

* * * * *